United States Patent [19]

Fujii

[11] 4,212,484
[45] Jul. 15, 1980

[54] HYDROPNEUMATIC SUSPENSION SYSTEM

[75] Inventor: Masayuki Fujii, Yokohama, Japan

[73] Assignee: Nissan Motor Company, Limited, Yokohama, Japan

[21] Appl. No.: 957,520

[22] Filed: Nov. 3, 1978

[30] Foreign Application Priority Data

Nov. 7, 1977 [JP] Japan .............................. 52/132435

[51] Int. Cl.² ............................................. B60G 17/04
[52] U.S. Cl. ................................ 280/707; 267/65 D; 280/708; 280/714; 280/43.23
[58] Field of Search .................... 280/43.23, 708, 714, 280/6 H, 707, 709; 267/65 D

[56] References Cited

U.S. PATENT DOCUMENTS

| 3,558,155 | 1/1971 | Jackson | 280/707 |
| 3,632,131 | 1/1972 | Engfer | 280/707 |
| 3,884,496 | 5/1975 | Ito | 280/708 |
| 3,913,938 | 10/1975 | Aikawa | 280/708 |
| 3,953,040 | 4/1976 | Unruh | 280/714 |

Primary Examiner—Robert R. Song
Attorney, Agent, or Firm—Schwartz, Jeffery, Schwaab, Mack, Blumenthal & Koch

[57] ABSTRACT

A hydropneumatic suspension system selectively lowers the level of a vehicle body above the ground to afford entry/exit and loading/unloading ease. A normally open solenoid valve is operative to cut supply of fluid under pressure to self-levelling suspension units while a normally closed solenoid valve is operative to communicate inlets of the suspension units to a reservoir by way of relief valves which regulate the fluid pressure in the suspension units.

15 Claims, 8 Drawing Figures

HYDROPNEUMATIC SUSPENSION SYSTEM

BACKGROUND OF THE INVENTION

This invention relates in general to a hydropneumatic suspension system for wheeled vehicles and, more particularly, to improvements in a hydropneumatic suspension system adapted for maintaining the level of a vehicle body above the ground substantially constant independently of a load applied thereto as well as for providing soft, cushioned ride.

This kind of suspension system has been fitted to various wheeled vehicles and its function is well-known in the art.

This invention contemplates to solve the following problems existing in some wheeled vehicles by improving the suspension system.

That is, in a known wheeled vehicle, e.g. a known passenger vehicle, there have been a great tendency to determine vehicle dimensions related to entry/exit ease or ingress/egress ease, e.g. heights of a body side sill and passenger seats, by giving priority to structural strength, road clearance and riding comfort. As a result, entry/exit ease has not been satisfactory in some passenger vehicles, especially in a relatively large passenger vehicle such as a limousine. In case of vans and trucks, it is further necessary to set wheel clearance, i.e. necessary space between tires and the nearest part of a body to allow operation of a truck or van without damage to the tires, at a relatively large value. As a result, the level of a loading platform or cargo floor above the ground has not necessarily been suited for loading and unloading.

SUMMARY OF THE INVENTION

It is, therefore, an object of the present invention to provide a hydropneumatic suspension system for a wheeled vehicle including means for selectively lowering a vehicle body to a predetermined low level to afford entry/exit ease and loading/unloading ease.

It is a further object of the present invention to provide a hydropneumatic suspension system with novel and useful means for a wheeled vehicle which is simple in construction, inexpensive to manufacture and can be easily adapted to a variety of vehicle bodies with practically no modification to the bodies.

BRIEF DESCRIPTION OF THE DRAWINGS

These and other objects and features of the present invention will be more apparent from the following description in conjunction with the accompanying drawings, in which.

DESCRIPTION OF THE PREFERRED EMBODIMENT

Figure 1:
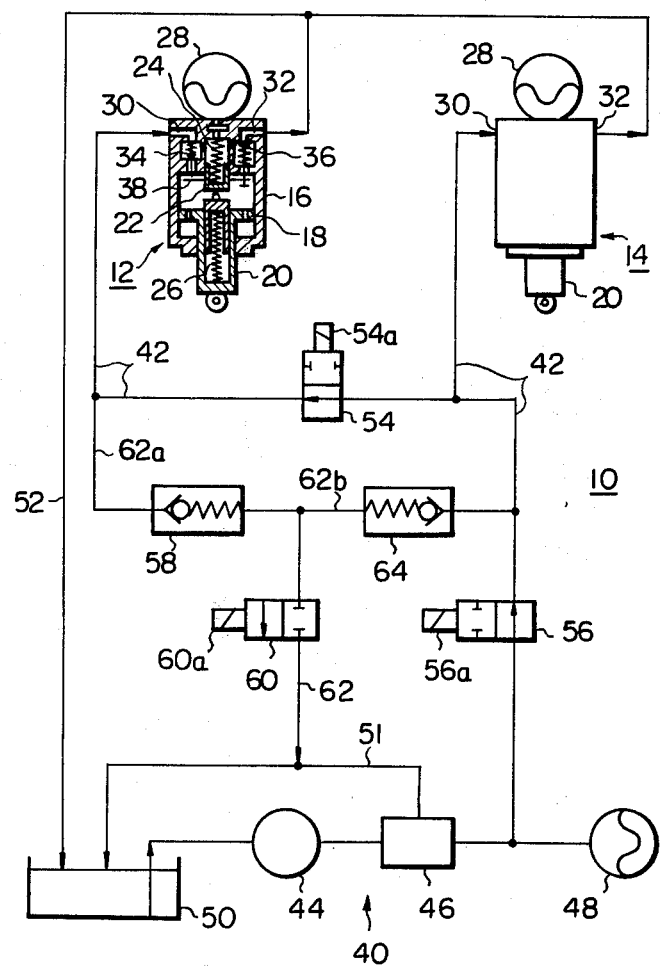
FIG. 1 is a schematic diagram of a first embodiment of a hydropneumatic suspension system according to the present invention.

Referring now to FIG. 1, a hydropneumatic suspension system 10 for a body of a wheeled vehicle embodying the present invention includes self-levelling suspension units 12 and 14 which are operatively associated with front and rear wheels of the vehicle (not shown), respectively. Although only two suspension units 12 and 14 are shown in FIG. 1, the suspension system 10 actually includes four self-levelling suspension units, one for each wheel of the vehicle. Two suspension units are omitted for the purpose of brevity because the suspension units for the other front and rear wheels will be arranged to communicate with hydraulic fluid supply and drain lines in the same manner as the two suspension units illustrated. That is, the suspension system 10 is constructed to include two pairs of suspension units, one for left and right front wheels and the other for left and right rear wheels, each being arranged to communicate with hydraulic fluid supply and drain lines in the same manner.

The suspension units 12 and 14 are structurally the same and therefore the explanation of the structure thereof is made only to the suspension unit 12.

The suspension unit 12 includes a cylinder 16, a piston 18 slidably received by the cylinder 16, and a piston rod 20 extending from the piston 18 and protruded from one end of the cylinder 16. A vehicle body level sensing piston or a floating piston 22 is arranged between the other end of the cylinder 16 and the piston 18 and supported at an equilibrium position by means of springs 24 and 26. A hydropneumatic spring 28 is provided which is communicated with the interior of the cylinder 16 and acts as a suspension spring. The cylinder 16 is formed with inlet and outlet ports 30 and 32 in which poppet valves 34 and 36 are respectively disposed in a manner to normally close the inlet and outlet ports 30 and 32. The poppet valves 34 and 36 are operatively associated with a valve actuating member 38 which is secured to the floating piston 22 to move together therewith. The valve actuating member 38 is operative to push and pull the poppet valves 34 and 36 for thereby opening the inlet and outlet ports 30 and 32 and is arranged so as to make lost motion before pushing and pulling the poppet valves 34 and 36. The inlet and outlet ports 30 and 32, the poppet valves 34 and 36, the valve actuating member 38, the floating piston 22 and the springs 24 and 36 constitute self-levelling valve means for controlling expansion and contraction of the suspension unit 12 or 14 thereby to maintain the height of the vehicle body above the ground substantially constant independently of a load applied thereto.

The suspension unit 12 with the structure thus far briefly described is well-known in the art and is mounted on a wheeled vehicle by connecting the cylinder 16 to a body of the vehicle and the piston rod 20 to wheel supporting means of the vehicle such as an axle of a wheel (not shown).

The suspension system 10 further includes a source of hydraulic fluid under pressure 40 to which the inlet ports 30 of the suspension units 12 and 14 are connected through a hydraulic fluid supply or pressure line 42. The source 40 includes a pump 44, a pressure control valve 46 and an accumulator 48. The pump 44 draws hydraulic fluid from a hydraulic fluid reservoir 50 and pumps hydraulic fluid under pressure into the pressure line 42 and the accumulator 48 by way of the pressure control valve 46. The pressure control valve 46 is operative to return hydraulic fluid under pressure from the pump 44 to the reservoir 50 through a bypass line 51 when the pressure of hydraulic fluid supplied thereto exceeds a predetermined value so as to maintain the pressure of hydraulic fluid in the interior of the accumulator 48 and that in the pressure line 42 at a predetermined value.

The outlet ports 32 of the suspension units 12 and 14 are communicated with the reservoir 50 through a drain line 52.

The suspension system 10 further includes solenoid valves and relief valves, which will be described hereinbelow, for selectively communicating the inlet ports 30 of the suspension units 12 and 14 with the source of fluid under pressure 40 and the reservoir 50.

The inlet port 30 of the suspension unit 12 is communicable with the source 40 by way of solenoid valves 54 and 56 through the pressure line 42, and the inlet port 30 of the suspension unit 14 is communicable with the source 40 by way of the solenoid valve 56. The solenoid valve 56 is normally open and disposed in the pressure line 42 between the source 40 and the inlet ports 30 of the suspension units 12 and 14. Specifically, as shown in FIG. 1, the solenoid valve 56 is disposed in a portion of the pressure line 42 which is common to the suspension units 12 and 14. With this arrangement, the solenoid valve 56 normally establishes communication between the source 40 and the inlet ports 30 of the suspension units 12 and 14 and obstructs communication therebetween when a solenoid 56a is energized causing the solenoid valve 56 to close. The solenoid valve 54 is also normally open and disposed in the pressure line 42 between the inlet ports 30 of the suspension units 12 and 14. Specifically, as shown in FIG. 1, the solenoid valve 54 is disposed in a portion of the pressure line 42 which leads from the aforesaid common pressure line portion to the suspension unit 1. With this arrangement, the solenoid valve 54 normally establishes communication between the inlet ports 30 of the suspension units 12 and 14 and obstructs communication therebetween when a solenoid 54a is energized causing the solenoid valve 54 to close.

The inlet port 30 of the suspension unit 12 is further communicable with the reservoir 50 by way of a relief valve 58 and a solenoid valve 60 through the pressure line 42, a drain line 62 and the bypass line 51. The inlet port 30 of the suspension unit 14 is also communicable with the reservoir 50 by way of a relief valve 64 and the solenoid valve 60 through the pressure line 42, the drain line 62 and the bypass line 51. The solenoid valve 60 is normally closed and disposed in the drain line 62 between the reservoir 50 and the inlet ports 30 of the suspension units 12 and 14. Specifically, as shown in FIG. 1, the solenoid valve 60 is disposed in a portion of the drain line 62 which is common to the suspension units 12 and 14. With this arrangement, the solenoid valve 60 normally obstructs communication between the reservoir 50 and the inlet ports 30 of the suspension units 12 and 14 and establishes communication therebetween when a solenoid 60a is energized causing the solenoid valve 60 to open. The relief valve 58 is disposed in the drain line 62 between the inlet port 30 of the suspension unit 12 and the reservoir 50. Specifically, as shown in FIG. 1, the drain line 62 is bifurcated at an upstream end thereof into first and second lines 62a and 62b: the relief valve 58 is disposed in the first branch line 62a and the relief valve 64 is disposed in the second branch line 62b. The relief valves 58 and 64 are adapted to provide communication between the inlet ports 30 of the suspension units 12 and 14 respectively and the solenoid valve 60 when the pressure of hydraulic fluid in the branch lines 62a and 62b is above a predetermined value and obstruct communication therebetween when the pressure in question is below the predetermined value, for the purpose as will be explained hereinafter. In this manner, the relief valves 58 and 64 serve to maintain the pressure of hydraulic fluid in the interiors of the suspension units 12 and 14 above a predetermined value when communication is established between the inlet ports 30 of the suspension units 12 and 14 and the reservoir 50. The normally open solenoid valves 54 and 56 and the normally closed solenoid valve 60 are adapted to be energized synchronously with one another so that the solenoid valves 54, 56 and 60 are respectively brought into closed and open positions thereof substantially at the same time.

The operation of the hydropneumatic suspension system 10 of FIG. 1 will now be described.

The suspension system 10 is illustrated in FIG. 1 in an operative condition into which it is put when the vehicle is in motion or ready for motion. In this operative condition, the solenoids 54a, 56a and 60a are kept de-energized, so that the normally open solenoid valves 54 and 56 are held open to communicate the inlet ports 30 of the suspension units 12 and 14 to the source 40, and the normally closed solenoid valve 60 is held closed to obstruct communication between the inlet ports 30 and the reservoir 50. In this case, when the vehicle body is maintained at a predetermined level above the ground, i.e. when the pressure of hydraulic fluid in the interiors of the suspension units 12 and 14 is sufficient to support the weight and load of the vehicle, the suspension units 12 and 14 are in conditions in which the poppet valves 34 and 36 close the inlet and outlet ports 30 and 32, respectively. When the height of the vehicle body above the ground is diverged away from the predetermined level, the piston 18 is shifted away from its normal position within the cylinder 16, resulting in an unbalance of the opposing forces of the springs 24 and 26. The floating piston 22 thus moves in response to the divergence of the vehicle body level. However, the slight divergence of the vehicle body level does not cause a reaction of the self-levelling valve means due to the lost motion effect of the floating piston 22. When the divergence of the vehicle body level exceeds a predetermined value, the floating piston is shifted from the normal equilibrium position to a new equilibrium position where the valve actuating member 38 pushes the poppet valve 34 upwardly or pulls the the poppet valve 34 downwardly as viewed in the drawing. This results in opening of the inlet port 30 or the outlet port 32. Hydraulic fluid under pressure from the source 40 is thus introduced into the interior of the suspension units 12 and 14 through the inlet ports 30 or the hydraulic fluid in the interiors of the suspension units 12 and 14 is drained therefrom through the outlet ports 32 until the vehicle body returns to the predetermined level. When the predetermined level of the vehicle body is retained, the floating piston 22 returns to the initial position thereof together with the valve actuating member 38 thus causing the poppet vales 34 and 36 to close the inlet and outlet ports 30 and 32. Introduction of hydraulic fluid under pressure into the interior of the suspension units 12 and 14 or drainage of hydraulic fluid from the suspension units 12 and 14 is thus ended. In this manner, the suspension system 10 maintains the height of the vehicle body above the ground at a substantially constant level independently of a load applied thereto.

Easy access to a cab and a loading platform of a vehicle is achieved as follows:

When it is required to lower the height of the vehicle body in order to provide easy access to the cab and/or the loading platform of the vehicle, i.e. in order that passengers of the vehicle may enter and leave the cab with ease and that loading onto and unloading from the loading platform may be done with ease, the operator of the vehicle operates a control switch (not shown) which can be arranged in a dash board of the vehicle and is operatively connected to the solenoid valves 54, 56 and 60 by way of a suitable solenoid valve control unit (not shown) so that the solenoids 54a, 56a and 60a are energized synchronously with one another. The solenoid valves 54 and 56 are actuated to close and the solenoid valve 60 to open. The solenoid valve 56 thus obstructs communication between the source 40 and the inlet ports 30 of the suspension units 12 and 14 while the solenoid valve 54 obstructs communication between the inlet ports 30 of the suspension units 12 and 14. The solenoid valve 60 establishes communication between the reservoir 50 and the inlet ports 30 of the suspension units 12 and 14. When the solenoid valves 54, 56 and 60 are set in conditions as above, the pressure of hydraulic fluid in the interiors of the suspension units 12 and 14 causes the poppet valves 34 to open the inlet ports 30 overcoming the opposing force applied to the poppet valves 34 in the direction to close same since the pressure of hydraulic fluid in the inlet ports 30 reduces. Hydraulic fluid in the interiors of the suspension units 12 and 14 is thus drained off to the reservoir 50 by way of the relief valves 58 and 64 respectively and the solenoid valve 60 until the pressure of hydraulic fluid in the interiors of the suspension units 12 and 14 is lowered to a predetermined value determined by the relief valves 58 and 64.

Figure 2:
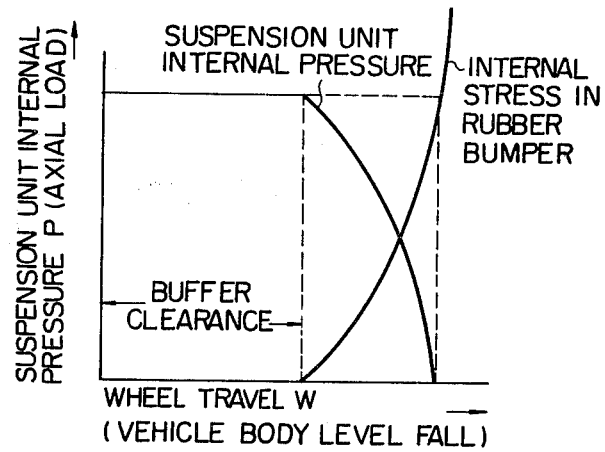
FIG. 2 is a graph showing the relation between a wheel travel W and a fluid pressure P in the interior of a self-levelling suspension unit incorporated in the suspension system of FIG. 1.

FIG. 2 shows the relation between a wheel travel (amount of vehicle body level fall) and a fluid pressure in the interior of a suspension unit (axial load on suspension unit). As will be understood from this graph, the pressure of hydraulic fluid in the interior of the suspension unit is maintained at a constant value until the vehicle body level falls by the wheel travel W to a level where the vehicle body abuts onto a rubber bumper since the axial load on the suspension unit does not change until then. When the vehicle body level further falls beyond the wheel travel W, the axial load on the suspension unit and therefore the pressure of hydraulic fluid in the interior of the suspension unit reduces since the weight and load of the vehicle are now supported by both the suspension unit and the rubber bumper. The rubber bumper supports more part of the weight and load of the vehicle as the fall of the vehicle body level beyond the wheel travel W increases.

Due to this fact, the height of the vehicle body can be lowered to a desired low level by regulating the fluid pressure in the interior of the suspension unit at a corresponding value after the vehicle body falls by the wheel travel W. The relief valves 58 and 64 prevent the suspension units 12 and 14 from being further drained off when the fluid pressure in the interiors of the suspension units is lowered to the predetermined value.

The height of the vehicle body above the ground is in this manner lowered to and maintained at a predetermined low level which corresponds to the fluid pressure in the interiors of the suspension units 12 and 14 and which is effective to afford entry/exit ease and loading/unloading ease or suited for easy access to the cab and the loading platform of the vehicle.

When passengers finish making ingress and egress into and out of the cab of the vehicle and/or loading onto and unloading from the loading platform of the vehicle is ended, the operator of the vehicle operates the control switch in order to raise the vehicle body to the normal level suited for vehicle travelling.

When the operator of the vehicle operates the control switch to de-energize the solenoids 54a, 56a and 60a synchronously with one another, the solenoid valves 54, 56 and 60 return to the normal positions where the solenoid valves 54 and 56 open while the solenoid valve 60 is closed, thus causing to put into action the self-levelling valve means of the suspension units 12 and 14. The vehicle body is thus raised up to the normal level suited for vehicle travelling.

Figure 3:
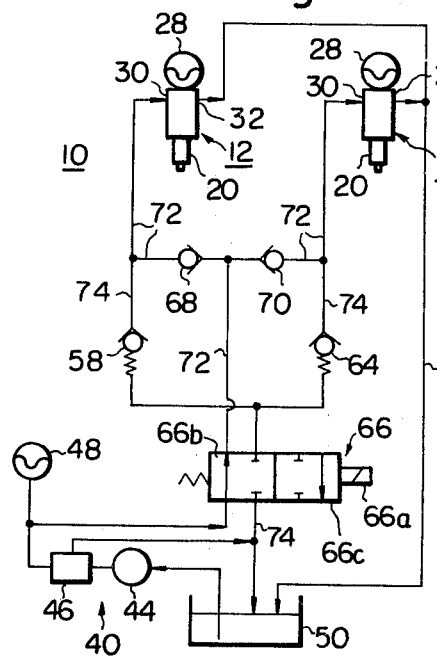
FIGS. 3 to 8 are schematic diagrams showing second to seventh embodiments of a hydropneumatic suspension system according to the present invention, respectively.

Referring to FIG. 3, a second embodiment of a hydropneumatic suspension system of this invention will be described. In FIG. 3, similar parts of the first embodiment of FIG. 1 are given similar reference numerals and a detailed description thereof will be omitted to avoid useless repetition.

In this second embodiment, the solenoid valves 56 and 60 of FIG. 1 have been replaced by a two-position solenoid valve 66 and the solenoid valve 54 of FIG. 1 has been replaced by check valves 68 and 70.

The solenoid valve 66 is disposed in pressure and drain lines 72 and 74 in a manner to be located in the pressure line 72 between the source 40 and the inlet ports 30 of the suspension units 12 and 14 and in the drain line 74 between the reservoir 50 and the inlet ports 30 and the suspension units 12 and 14. The solenoid valve 66 is provided with a solenoid 66a and is normally held at a first operative position 66b thereof as illustrated in FIG. 3, with the solenoid valve 66a de-energized. In this condition, with the solenoid valve de-energized, the solenoid valve 66 provides communication between the source 40 and the inlet ports 30 of the suspension units 12 and 14 and obstructs communication between the reservoir 50 and the inlet ports 30 of the suspension units 12 and 14. When the solenoid 66a is energized, the solenoid valve 66 is shifted from the first operative position 66b to a second operative position 66c thereof. In this condition, with the solenoid 66a energized, the solenoid valve 66 obstructs communication between the source 40 and the inlet ports of the suspension units 12 and 14 and provides communication between the reservoir 50 and the inlet ports 30 of the suspension units 12 and 14.

The check valves 68 and 70 are disposed in the pressure line 72 between the inlet ports 30 of the suspension units 12 and 14 respectively and the solenoid valve 66 to obstruct fluid flow in the pressure line 72 between the inlet ports 30 while allowing fluid flow in the pressure line from the source 40 to the respective inlet ports 30.

With this arrangement, the solenoid valve 66 is normally held at the first operative position 66b thereby to introduce hydraulic fluid under pressure from the source 40 to the inlet ports 30 of the suspension units 12 and 14 by way of the check valves 68 and 70, respectively. The self-levelling valve means of the suspension units 12 and 14 are thus conditioned to operate in order thereby to maintain the height of the vehicle body above the ground at the normal level independently of a load applied thereto in a similar manner as has been described with respect to the first embodiment of FIG. 1.

When it is required to lower the level of the vehicle body to afford entry/exit ease and loading/unloading ease, the solenoid 66a of the solenoid valve 66 is energized thereby to shift the solenoid valve 66 from the first operative position 66b to the second operative position 66c. The hydraulic fluid in the interior of the suspension units is thus drained to the reservoir 50 by way of the relief valves 58 and 64 until the fluid pressure in the interior of the suspension units 12 and 14 is lowered to the predetermined value in the same manner as have been described with reference to the first embodiment of FIG. 1. In this manner, the height of the vehicle body above the ground is lowered from the normal level suited for vehicle travelling to the predetermined low level effective to afford entry/exit ease and loading/unloading ease.

When it is required to elevate the vehicle body from the predetermined low level to the normal level, the solenoid 66a is de-energized to shift the solenoid valve 66 from the second operative position 66c to the first operative position 66b. The self-levelling valve means of the suspension units 12 and 14 are thus brought into action whereby the height of the vehicle body is elevated to the normal level.

Figure 4:
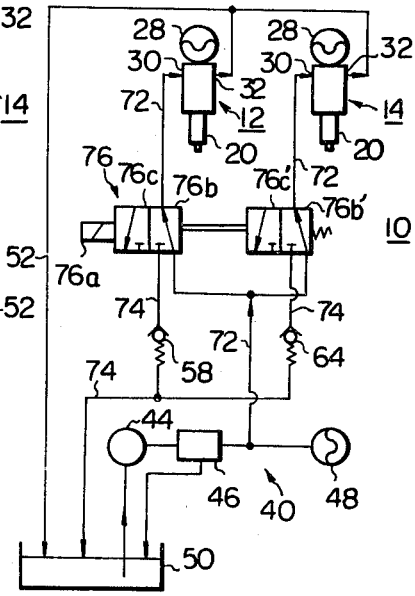

FIG. 4 shows a third embodiment of a hydropneumatic suspension system of this invention.

In this third embodiment of FIG. 4, the solenoid valve 66 and the check valves 68 and 70 of FIG. 3 have been replaced by a two-position solenoid valve 76 of a combination type. The solenoid valve 76 is illustrated in FIG. 4 in its quiescent condition having a first set of operative positions 76b and 76b', with a solenoid 76a de-energized. When the solenoid 76a is energized, the solenoid valve 76 is shifted from the first set of operative positions 76b and 76b' to the second set of operative positions 76c and 76c'. The solenoid valve 76 produces substantially the same effects as the solenoid valve 66 and the check valves 68 and 70.

With this arrangement, the solenoid valve 76 is normally held at the first set of operative positions 76b and 76b', with the solenoid 76a de-energized, whereby the height of the vehicle body above the ground is maintained at the normal level suited for vehicle travelling. When it is required to lower the vehicle body to afford entry/exit ease and loading/unloading ease, the solenoid is energized to shift the solenoid valve 76 from the first set of operative positions 76b and 76b' to the second set of operative positions 76c and 76c'. The vehicle body is thus lowered to the predetermined low level suited for easy access to the cab and/or the loading platform of the vehicle in the same manner as the first and second embodiments. The normal level of the vehicle body is retained by de-energizing the solenoid 76a.

In the first, second and third embodiments thus far described and shown, the solenoid valve 54, the check valves 68 and 70 and the solenoid valve 76 are respectively adopted to obstruct communication between the inlet ports 30 of the suspension units 12 and 14 during drainage thereof through the ports 30. However, in case that the fluid pressure in the interior of one of the suspension units 12 and 14 is always higher than that of the other during the time that the level of the vehicle body is maintained at the predetermined low level, those valves, especially the solenoid valve 54 of FIG. 1 can be replaced by a check valve which is arranged to obstruct fluid flow in the pressure line 42 to the direction from a high pressure suspension unit 12 or 14 subjected to a higher axial load to a low pressure suspension unit 14 and 12 subjected to a lower axial load.

Figure 5:
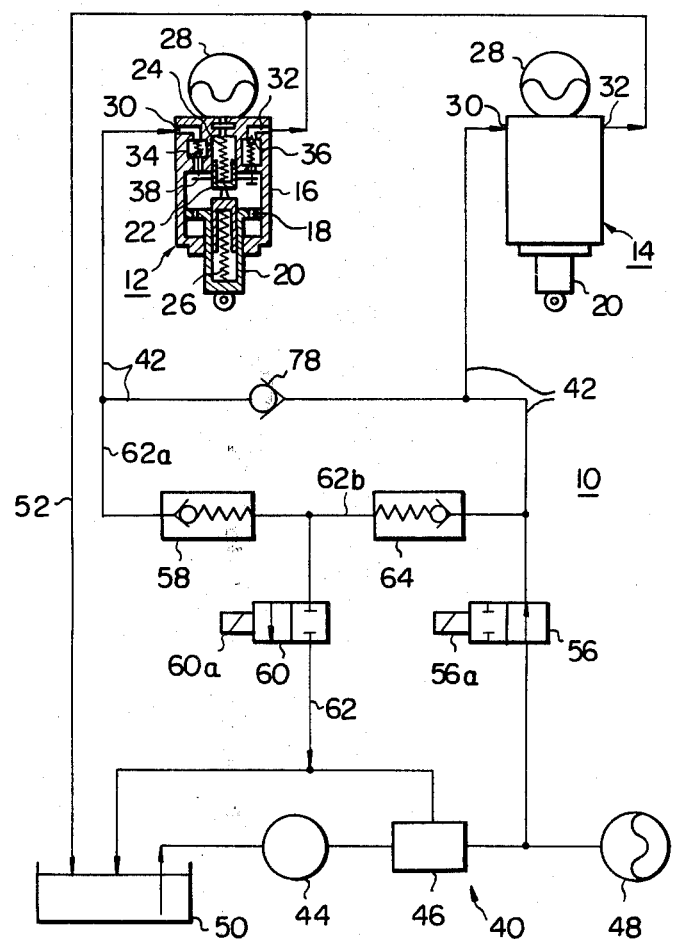

FIG. 5 shows a fourth embodiment of a hydropneumatic suspension system of this invention. In this embodiment, the solenoid valve 54 of FIG. 1 has been replaced by a check valve 78. When the fluid pressure in the interior of the suspension unit 12 for a front wheel is always higher than that of the suspension unit 14 for a rear wheel during the drainage of the suspension units 12 and 14 through the inlet ports 30, the check valve 78 can be employed in place of the solenoid valve 54 of FIG. 1 to obstruct fluid flow in the pressure line 42 to the direction from the suspension unit 12 to the suspension unit 14.

Figure 6:
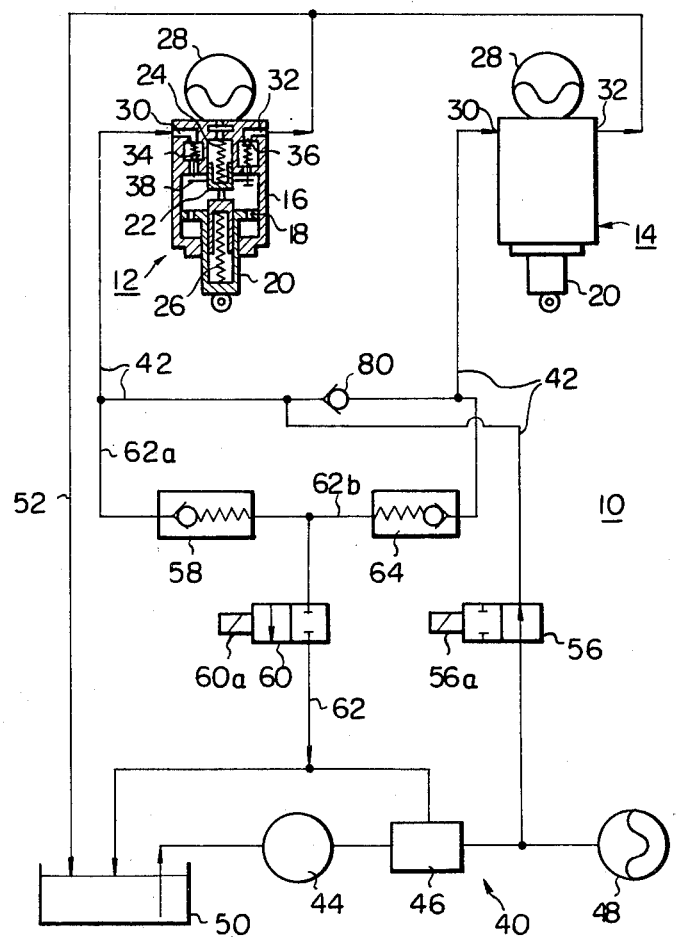

FIG. 6 shows a fifth embodiment of a hydropneumatic suspension system of this invention. In this embodiment, the solenoid valve 54 of FIG. 1 has been replaced by a check valve 80. When the fluid pressure in the interior of the suspension unit 14 is always higher than that of the suspension unit 12 during the drainage of the suspension units 12 and 14 through the inlet ports 30, the check valve 80 can be employed in place of the solenoid valve 54 of FIG. 1 to obstruct fluid flow in the pressure line 42 to the direction from the suspension unit 14 to the suspension unit 12.

Figure 7:
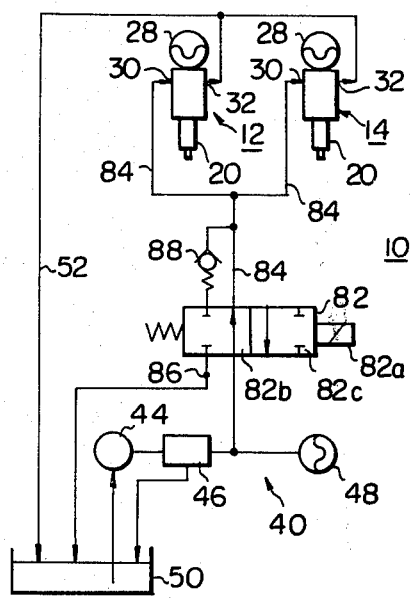
Figure 8:
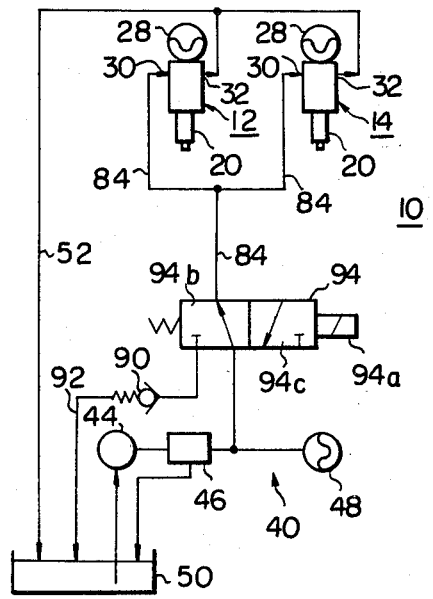

If the pressure difference between the interiors of the front and rear suspension units 12 and 14 is negligibly small during the time that the height of the vehicle body above the ground is maintained at the predetermined low level, the check valves 78 and 80 of FIGS. 5 and 6 can be deleted and, at the same time, the relief valves 58 and 64 can be replaced by a single relief valve, as shown in FIGS. 7 and 8.

FIG. 7 shows a sixth embodiment of a hydropneumatic suspension system of this invention. In this embodiment, a two-position solenoid valve 82 is shown in its quiescent condition having a first operative position 82b, with a solenoid 82a de-energized. In this condition, with the solenoid 82a de-energized, the solenoid valve 82 provides communication between the inlet ports 30 of the suspension units 12 and 14 through a pressure line 84 while obstructs communication between the inlet ports of the suspension units 12 and 14 and the reservoir 50. When the solenoid 82a is energized, the solenoid valve 82 is shifted from the first operative position 82b to a second operative position 82c thereof. In this condition, with the solenoid 82a energized, the solenoid valve 82 obstructs communication between the inlet ports 30 of the suspension units 12 and 14 and the source 40 and establishes communication between the inlet ports 30 of the suspension units 12 and 14 and the reservoir 50 through the pressure line 84, relief valve 88 and a drain line 86 upstream of the solenoid valve 82, i.e. between the solenoid valve 82 and inlet ports of the suspension units 12 and 14.

FIG. 8 shows an embodiment of a hydropneumatic suspension system of this invention which is constructed and arranged substantially similar to the embodiment of FIG. 7 but is distinct thereover in that a relief valve 90 is disposed in a drain line 92 downstream of a two-position solenoid valve 94, i.e. the relief valve 90 is disposed in the drain line 92 between the solenoid valve 94 and the reservoir 50. The solenoid valve 94 is normally held at a first operative position thereof 94b, with a solenoid 94a de-energized and is shifted therefrom to a second operative position 94c when the solenoid 94a is energized. The solenoid valve 94 produces exactly the same effects as the solenoid valve 82 of FIG. 7.

The embodiments of FIGS. 7 and 8 are normally operated in a condition in which the solenoid valves 82 and 84 are respectively held at the first operative positions 82b and 94b, with the solenoids 82a and 94a de-energized. In this condition, hydraulic fluid under pressure is introduced from the source 40 to the inlet ports 30 whereby the height of the vehicle body above the ground is maintained at the normal level suited for vehicle travelling. When it is required to lower the vehicle body to the predetermined low level suited for easy access to the cab and the loading platform of the vehicle, the solenoids 82a and 94a are energized to shift the solenoid valves 82 and 94 from the first operative positions 82b and 94b to the second operative positions 82c and 94c, respectively. The vehicle body is thus lowered to the predetermined low level in the same manner as has been described with reference to the first embodiment of FIG. 1. By de-energizing the solenoids 82a and 94a, the normal level of the vehicle body is retained.

As will be understood from the description thus far made, the hydropneumatic suspension system of this invention is constructed and arranged to make it possible to lower the height of the vehicle body above the ground to a predetermined low level effective to afford entry/exit ease and loading/unloading ease, when required, in addition to the function that it maintains the level of the vehicle body above the ground at the normal constant level independently of a load applied thereto.

What is claimed is:

1. In a hydropneumatic suspension system having a source of fluid under pressure, a fluid reservoir and a plurality of self-levelling suspension units which are mounted between wheel supporting means and a body of a wheeled vehicle and equipped with self-levelling valve means operative to communicate interiors of the suspension units through inlets and outlets thereof with the source and the reservoir for maintaining the level of the vehicle body above the ground substantially constant, the improvement comprising:
   electrically controlled normally open valve means connected between the source and the inlets of the self-levelling suspension units and operative to obstruct communication therebetween when actuated to close;
   electrically controlled normally closed valve means connected between the reservoir and inlets of the self-levelling suspension units and operative to establish communication therebetween when actuated to open; and
   relief valve means connected in series with said normally closed valve means so as to maintain the fluid pressure in the interior of each of the self-levelling suspension units above a predetermined value when said normally closed valve means are actuated to open;
   in which said normally open and normally closed valve means are adapted to be actuated synchronously with one another such that, when said valve means are actuated, the level of the vehicle body above the ground is lowered to a predetermined low level effective to afford entry/exit ease and loading/unloading ease.

2. The improvement in a hydropneumatic suspension system as set forth in claim 1, further comprising a pressure line and a drain line, said pressure line interconnecting the source and the inlets of the suspension units and in which are disposed said normally open valve means, said drain line interconnecting the reservoir and the portion of said pressure line extending between said normally open valve means and the inlets of the suspension units, said normally closed valve means and said relief valve means being disposed in said drain line.

3. The improvement in a hydropneumatic suspension system as set forth in claim 2, in which said electrically controlled normally open and normally closed valve means comprise a normally open solenoid valve and a normally closed solenoid valve, respectively.

4. The improvement in a hydropneumatic suspension system as set forth in claim 3, in which said normally open and normally closed solenoid valves are integral.

5. The improvement in a hydropneumatic suspension system as set forth in claim 2, in which said suspension units comprise a first set of suspension units for front wheels of the vehicle and a second set of suspension units for rear wheels of the vehicle and in which said drain line is bifurcated at an upstream end thereof into first and second branch lines, said first branch line being connected to the inlets of the first set of suspension units and said second branch line being connected to the inlets of the second set of suspension units, and said relief valve means comprise a pair of relief valves disposed in said first and second branch lines, respectively.

6. The improvement in a hydropneumatic suspension system as set forth in claim 5, in which said pair of relief valves are adapted to maintain the fluid pressures in the interiors of the corresponding sets of suspension units above predetermined values which are different from one another, respectively.

7. The improvement in a hydropneumatic suspension system as set forth in claim 1, in which said normally open and normally closed valve means comprise a two-position solenoid valve.

8. The improvement in a hydropneumatic suspension system as set forth in claim 1, in which said suspension units comprise a first set of suspension units for front wheels of the vehicle and a second set of suspension units for rear wheels of the vehicle and in which the improvement further comprises means for blocking communication between the inlets of the first and second sets of suspension units.

9. The improvement in a hydropneumatic suspension system as set forth in claim 8, in which said blocking means comprise a normally closed solenoid valve.

10. The improvement in a hydropneumatic suspension system as set forth in claim 8, in which said blocking means comprise a check valve.

11. The improvement in a hydropneumatic suspension system as set forth in claim 8, in which said blocking means comprise a pair of check valves.

12. In a hydropneumatic suspension system having a source of fluid under pressure, a fluid reservoir and a plurality of self-levelling suspension units which are mounted between wheel supporting means and a body of a wheeled vehicle and equipped with self-levelling valve means operative to communicate interiors of the suspension units through inlets and outlets thereof with the source and the reservoir for maintaining the level of the vehicle body above the ground substantially constant, the improvement comprising:
   a normally open solenoid valve connected between the source and the inlets of the self-levelling suspension units through a pressure line and operative to obstruct communication therebetween when actuated to close;

a drain line interconnecting the reservoir and the portion of the pressure line extending between said normally open solenoid valve and the inlets of the self-levelling suspension units;

a normally closed solenoid valve disposed in said drain line and operative to establish communication between the reservoir and inlets of the self-levelling suspension units when actuated to open; and relief valve means disposed in said drain line and connected in series with said normally closed solenoid valve, said relief valve means being operative to maintain the fluid pressure in the interior of each of the self-levelling suspension units above a predetermined value when said normally closed solenoid valve is actuated to open;

in which said normally open and normally closed solenoid valves are adapted to be actuated synchronously with one another such that, when said solenoid valves are actuated, the level of the vehicle body is lowered to a predetermined low level effective to afford entry/exit ease and loading/unloading ease.

13. The improvement in a hydropneumatic suspension system as set forth in claim 12, in which said normally open and normally closed solenoid valves are integral.

14. The improvement in a hydropneumatic suspension system as set forth in claim 12, in which said suspension units comprise a first set of suspension units for front wheels of the vehicle and a second set of suspension units for rear wheels of the vehicle and in which said drain line is bifurcated at an upstream end thereof into first and second branch lines, said first branch line being connected to the first set of suspension units and said second branch line being connected to the second set of suspension units, and said relief valve means comprise a pair of relief valves disposed in said first and second branch lines, respectively.

15. The improvement in a hydropneumatic suspension system as set forth in claim 14, in which said pair of relief valves is adapted to maintain the fluid pressure in the interiors of the corresponding sets of suspension units above predetermined values which are different from one another, respectively.

* * * * *